US007224399B2

(12) United States Patent
Song

(10) Patent No.: US 7,224,399 B2
(45) Date of Patent: May 29, 2007

(54) DE-INTERLACING METHOD AND APPARATUS, AND VIDEO DECODER AND REPRODUCING APPARATUS USING THE SAME

(75) Inventor: Byung-cheol Song, Suwon-si (KR)

(73) Assignee: Samsung Electronics Co., Ltd., Gyeonggi-do (KR)

( * ) Notice: Subject to any disclaimer, the term of this patent is extended or adjusted under 35 U.S.C. 154(b) by 529 days.

(21) Appl. No.: 10/866,873

(22) Filed: Jun. 15, 2004

(65) Prior Publication Data
US 2004/0263685 A1 Dec. 30, 2004

(30) Foreign Application Priority Data
Jun. 27, 2003 (KR) .................. 10-2003-0042789

(51) Int. Cl.
H04N 7/01 (2006.01)
H04N 11/20 (2006.01)
(52) U.S. Cl. ...................... 348/452; 348/448
(58) Field of Classification Search ........ 348/448–452, 348/458, 441, 700
See application file for complete search history.

(56) References Cited

U.S. PATENT DOCUMENTS 5,943,099 A * 8/1999 Kim ........................ 348/448
5,959,681 A * 9/1999 Cho ........................ 348/452
6,822,691 B1* 11/2004 Kim et al. ................. 348/452
6,922,214 B1* 7/2005 Weston ..................... 348/448
2003/0007091 A1 1/2003 Nagata

FOREIGN PATENT DOCUMENTS

JP  10-2001-0026089 A  4/2001
KR   2001-0045333 A   6/2001
KR   2002-0060835 A   7/2002

* cited by examiner

Primary Examiner—Michael H. Lee
(74) Attorney, Agent, or Firm—Sughrue Mion, PLLC

(57) ABSTRACT

A de-interlacing method and apparatus, and a video decoder and a reproducing apparatus using the same are disclosed. The de-interlacing method, for transforming an interlaced format into a progressive format, includes: (a) obtaining a first difference value between at least one pixel of a previous field and at least one pixel of a next field, which are adjacent to a pixel to be interpolated of a current field; (b) obtaining a second difference value between at least one pixel of the current field and at least one pixel of the previous field or the next field, which are adjacent to the pixel to be interpolated; and (d) obtaining a value of the pixel to be interpolated by weighting a spatial interpolation value and a temporal interpolation value of the pixel to be interpolated according to an interpolation mode selected on the basis of the first and second difference values.

20 Claims, 16 Drawing Sheets

FRAME

FIELD

FIELD

DE-INTERLACING METHOD AND APPARATUS, AND VIDEO DECODER AND REPRODUCING APPARATUS USING THE SAME

BACKGROUND OF THE INVENTION

This application claims the priority of Korean Patent Application No. 2003-42789, filed on Jun. 27, 2003, in the Korean Intellectual Property Office, the disclosure of which is incorporated herein in its entirety by reference.

1. Field of the Invention

The present invention relates to a de-interlacing method and apparatus, which transform an interlaced format video into a progressive format video, and a video decoder and a reproducing apparatus using the same.

2. Description of the Related Art

In general, a video signal is realized in an interlaced format or a progressive format. An interlaced format video signal includes a plurality of fields. A progressive format video signal includes a plurality of frames. One frame is made by merging two fields so that lines of one of the two fields are arranged between lines of the other. The interlaced format video signal can supply higher video quality with less amount of data than the progressive format video signal. However, since the interlaced format video signal requires two fields to display one picture, signal processing for reproduction is relatively complicated.

In case of a reproducing apparatus, such as a TV, which can handle the progressive format video signal, if the interlaced format video signal is input, the interlaced format video signal must be handled after the interlaced format is transformed into the progressive format. The format conversion is called de-interlacing or interlaced-to-progressive conversion (IPC).

The de-interlacing process includes an interpolation process for transforming fields included in the interlaced format video signal to frames. The interpolation is largely divided into a temporal interpolation using an average of two temporally adjacent pixels and a spatial interpolation using an average of two spatially adjacent pixels. The de-interlacing by the spatial interpolation is called two dimensional de-interlacing. The de-interlacing using both of the temporal interpolation and the spatial interpolation according to circumstances considering motion of the video signal is called three dimensional de-interlacing.

In the three dimensional de-interlacing, a conventional interpolation process is as follows. When a current field is interpolated, after a difference value between pixels of a previous field and a next field corresponding to a pixel to be interpolated is obtained, if the difference value is less than a predetermined threshold value, the temporal interpolation is performed by determining that a small motion exists, and if the difference value is more than the predetermined threshold value, the spatial interpolation is performed by determining that a large motion exists.

However, even though the difference value between the pixels of the previous field and the next field corresponding to the pixel to be interpolated is less than the predetermined threshold value, an object or a background quite different from objects or backgrounds of the previous field and the next field can exist in the current field, like, for example, when a hand is quickly moved up and down. Nevertheless, if the temporal interpolation is performed based on the difference value between the pixels of the previous field and the next field being less than the predetermined threshold value, an actual value of the pixel to be interpolated becomes noise and cannot be associated with adjacent pixel values.

SUMMARY OF THE INVENTION

The present invention provides a de-interlacing method and apparatus in which interpolation quality is improved by estimating motion of a video signal more precisely, and a video decoder and a reproducing apparatus using the same.

The present invention also provides a de-interlacing method and apparatus in which interpolation quality is improved by estimating motion of a video signal more precisely and using the estimated result in an interpolation process without increasing the number of line memories, and a video decoder and a reproducing apparatus using the same.

According to an aspect of the present invention, there is provided a de-interlacing method for transforming an interlaced format into a progressive format, the method comprising: (a) obtaining a first difference value between at least one pixel of a previous field and at least one pixel of a next field, which are adjacent to a pixel to be interpolated of a current field; (b) obtaining a second difference value between at least one pixel of the current field and at least one pixel of the previous field or the next field, which are adjacent to the pixel to be interpolated; and (d) obtaining a value of the pixel to be interpolated by weighting a spatial interpolation value and a temporal interpolation value of the pixel to be interpolated according to an interpolation mode selected on the basis of the first and second difference values.

According to another aspect of the present invention, there is provided a de-interlacing method for transforming an interlaced format into a progressive format, the method comprising: (a) obtaining a first difference value between at least one pixel of a previous field and at least one pixel of a next field, which are adjacent to a pixel to be interpolated of a current field; (b) obtaining a second difference value between at least one pixel of the current field and at least one pixel of the previous field or the next field, which are adjacent to the pixel to be interpolated; (c) obtaining a third difference value between at least one pixel of the current field existing in an upper row of the pixel to be interpolated and at least one pixel of the current field existing in a lower row of the pixel to be interpolated; and (d) obtaining a value of the pixel to be interpolated by weighting a spatial interpolation value and a temporal interpolation value of the pixel to be interpolated according to an interpolation mode selected on the basis of the first, second, and third difference values.

In an exemplary embodiment, step (d) comprises: if the first difference value is more than or equal to a first threshold value, assigning a value indicating that a large motion exists as a motion index value, if the first difference value is less than the first threshold value and more than or equal to a second threshold value, assigning a value indicating that a small motion exists as the motion index value, and selecting the interpolation mode according to the assigned motion index value (provided that the first threshold value is more than the second threshold value). Also, step (d) may comprise: if the first difference value is less than the second threshold value and the second difference value is more than or equal to a third threshold value, assigning the value indicating that a small motion exists as the motion index value and selecting the interpolation mode according to the assigned motion index value. Further, step (d) may comprise: if the first difference value is less than the second threshold value and the second difference value is more than or equal to the third threshold value, selecting the interpolation mode assigning a more weight on a spatial interpolation value of the pixel to be interpolated rather than a temporal interpolation value of the pixel to be interpolated.

In an exemplary embodiment, step (b) comprises: (b1) obtaining a difference value between at least one pixel, which exists in the current field, is adjacent to the pixel to be interpolated, and exists in an upper row of the pixel to be interpolated, and at least one pixel, which exists in the previous field, is adjacent to the pixel to be interpolated, and exists in the same row as the pixel to be interpolated, as the second difference value, (b2) obtaining a difference value between at least one pixel, which exists in the current field, is adjacent to the pixel to be interpolated, and exists in a lower row of the pixel to be interpolated, and at least one pixel, which exists in the previous field, is adjacent to the pixel to be interpolated, and exists in the same row as the pixel to be interpolated, as the second difference value, (b3) obtaining a difference value between at least one pixel, which exists in the current field, is adjacent to the pixel to be interpolated, and exists in an upper row of the pixel to be interpolated, and at least one pixel, which exists in the next field, is adjacent to the pixel to be interpolated, and exists in the same row as the pixel to be interpolated, as the second difference value, and/or (b4) obtaining a difference value between at least one pixel, which exists in the current field, is adjacent to the pixel to be interpolated, and exists in a lower row of the pixel to be interpolated, and at least one pixel, which exists in the next field, is adjacent to the pixel to be interpolated, and exists in the same row as the pixel to be interpolated, as the second difference value, and step (d) comprises: in a case where the first difference value is less than the second threshold value, if any one of the second difference values is more than or equal to the third threshold value, assigning the value indicating that a small motion exists as the motion index value, if all the second difference values are less than the second threshold value, assigning the value indicating that a motion does not exist as the motion index value, and selecting the interpolation mode according to the assigned motion index value.

In an exemplary embodiment, step (b) comprises: (b1) obtaining a difference value between at least one pixel, which exists in the current field, is adjacent to the pixel to be interpolated, and exists in an upper row of the pixel to be interpolated, and at least one pixel, which exists in the previous field, is adjacent to the pixel to be interpolated, and exists in the same row as the pixel to be interpolated, as the second difference value; (b2) obtaining a difference value between at least one pixel, which exists in the current field, is adjacent to the pixel to be interpolated, and exists in a lower row of the pixel to be interpolated, and at least one pixel, which exists in the previous field, is adjacent to the pixel to be interpolated, and exists in the same row as the pixel to be interpolated, as the second difference value; (b3) obtaining a difference value between at least one pixel, which exists in the current field, is adjacent to the pixel to be interpolated, and exists in an upper row of the pixel to be interpolated, and at least one pixel, which exists in the next field, is adjacent to the pixel to be interpolated, and exists in the same row as the pixel to be interpolated, as the second difference value; (b4) obtaining a difference value between at least one pixel, which exists in the current field, is adjacent to the pixel to be interpolated, and exists in a lower row of the pixel to be interpolated, and at least one pixel, which exists in the next field, is adjacent to the pixel to be interpolated, and exists in the same row as the pixel to be interpolated, as the second difference value, and step (d) comprises: in a case where the first difference value is less than the second threshold value, if any one of the second difference values is more than or equal to the third threshold value and the third difference value is less than a fourth threshold value, assigning the value indicating that a small motion exists as the motion index value, if any one of the second difference values is less than the third threshold value or the third difference value is more than or equal to the fourth threshold value, assigning the value indicating that a motion does not exist as the motion index value, and selecting the interpolation mode according to the assigned motion index value.

According to another aspect of the present invention, there is provided a de-interlacing method comprising: (a) assigning a motion index value for a pixel to be interpolated on the basis of a first difference value between at least one pixel of a previous field and at least one pixel of a next field, which are adjacent to the pixel to be interpolated of a current field, and a second difference value between at least one pixel of the current field and at least one pixel of the previous field or the next field, which are adjacent to the pixel to be interpolated; and (b) obtaining a value of the pixel to be interpolated by interpolating the pixel to be interpolated according to an interpolation mode selected on the basis of the assigned motion index value.

In an exemplary embodiment, step (a) comprises: if the first difference value is more than or equal to a first threshold value, assigning 2 as the motion index value; and if the first difference value is less than the first threshold value and more than or equal to a second threshold value, assigning 1 as the motion index value.

In an exemplary embodiment, step (a) comprises: if the first difference value is less than the second threshold value, obtaining the second difference value between at least one pixel of the current field and at least one pixel of the previous field or the next field, which are adjacent to the pixel to be interpolated; if the second difference value is more than or equal to a third threshold value, assigning 1 as the motion index value, and if the second difference value is less than the third threshold value, assigning 0 as the motion index value.

In an exemplary embodiment, step (b) comprises: obtaining a weighted average by weighting a spatial interpolation value or a temporal interpolation value of the pixel to be interpolated according to the selected interpolation mode.

According to another aspect of the present invention, there is provided a de-interlacing apparatus for transforming an interlaced format into a progressive format, the apparatus comprising: a motion detector which obtains a first difference value between at least one pixel of a previous field and at least one pixel of a next field, which are adjacent to a pixel to be interpolated of a current field, obtains a second difference value between at least one pixel of the current field and at least one pixel of the previous field or the next field, which are adjacent to the pixel to be interpolated, and determines a motion index value for the pixel to be interpolated on the basis of the obtained first and second difference values; an interpolator which calculates a spatial interpolation value by spatial interpolating the pixel to be interpolated and a temporal interpolation value by temporal interpolating the pixel to be interpolated; and a mode selector which outputs a weighted average as a value of the pixel to be interpolated by weighting the spatial interpolation value and the temporal interpolation value calculated by the interpolator according to the interpolation mode selected on the basis of the motion index value determined by the motion detector.

According to another aspect of the present invention, there is provided a video decoder in which the de-interlacing apparatus is installed.

According to another aspect of the present invention, there is provided a reproducing apparatus in which the de-interlacing apparatus is installed.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE ILLUSTRATIVE, NON-LIMITING EMBODIMENTS OF THE INVENTION

Hereinafter, the present invention will now be described more fully with reference to the accompanying drawings, in which exemplary embodiments of the invention are shown. Like reference numbers are used to refer to like elements throughout the drawings.

Figure 1:
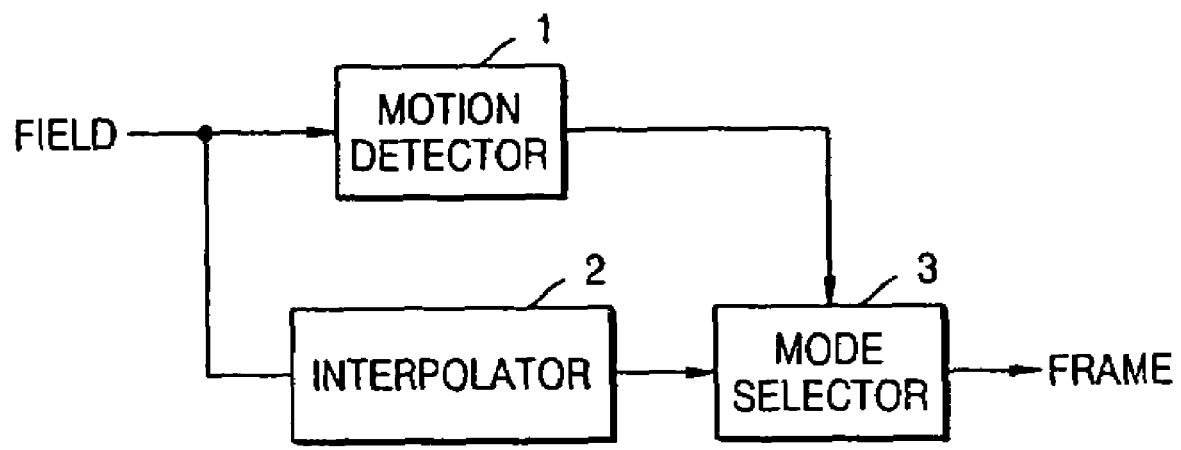
FIG. 1 is a block diagram of a de-interlacing apparatus according to an exemplary embodiment of the present invention.

FIG. 1 is a block diagram of a de-interlacing apparatus according to an exemplary embodiment of the present invention.

Referring to FIG. 1, the de-interlacing apparatus includes a motion detector 1, an interpolator 2, and a mode selector 3 to transform an input interlaced format video signal into a progressive format video signal, that is, to transform fields into frames.

The motion detector 1 detects difference values according to criteria of the present invention for all pixels to be interpolated in order to obtain values of the pixels using interpolation and assigns one of a plurality of motion index values for every pixel to be interpolated on the basis of the detected difference values. In more detail, the motion detector 1 obtains a first difference value between at least one pixel of a previous field and at least one pixel of a next field, which are adjacent to a pixel to be interpolated of a current field. If the first difference value is more than or equal to a first threshold value, the motion detector 1 determines that a large motion exists and assigns 2 as the motion index value. If the first difference value is less than the first threshold value and more than or equal to a second threshold value, the motion detector 1 determines that a small motion exists and assigns 1 as the motion index value. Here, the first and second threshold values are properly determined by experiments according to characteristics of the video signal, and the first threshold value is more than the second threshold value.

If the first difference value is less than the second threshold value, the motion detector 1 assigns the motion index value by determining whether a motion exists through the following procedures. That is, the motion detector 1 obtains a second difference value between at least one pixel of the current field and at least one pixel of the previous field or the next field, which are adjacent to the pixel to be interpolated, and if the obtained second difference value is more than or equal to a third threshold value, the motion detector 1 assigns 1 as the motion index value. That is, even if the first difference value is less than the second threshold value, the motion detector 1 further obtains the second difference value, and if the obtained second difference value is more than or equal to the third threshold value, the motion detector 1 determines that a very fast motion exists. That is, the motion detector 1 determines that different objects or backgrounds between the current field and the previous field and/or the next field exist. The third threshold value is also properly determined by experiments according to characteristics of the video signal.

In a conventional de-interlacing method, if a difference value between pixels existing before and after a pixel to be interpolated by a time axis, i.e., a difference value between pixels existing in a previous field and a next field, is less than a predetermined threshold value, the temporal interpolation is performed by determining that a motion does not exist. However, in the present invention, an error indicating that a motion does not exist even though the motion exists is avoided by preparing another index for assigning the motion index value and checking not only a difference value between an adjacent pixel of the previous field and an adjacent pixel of the next field but a difference value between an adjacent pixel of a current field and the adjacent pixel of the previous field and/or the adjacent pixel of the next field. Actually, when a hand, for example, is moved up and down very fast, the hand exists as an object in the current field, but only a background can exist in the previous field and the next field. Therefore, even though the first difference value is very small, a different object or background from that in the previous field and/or the next field can exist in the current field.

The interpolator 2 performs the temporal interpolation and the spatial interpolation on the pixel to be interpolated by adopting one of various conventional methods and methods to be developed in the next. By the temporal interpolation, a value of the pixel to be interpolated is determined by averaging at least two pixels adjacent to the pixel to be interpolated on the basis of a time axis. By the spatial interpolation, the value of the pixel to be interpolated is determined by averaging at least two adjacent pixels in a same field.

The mode selector 3 determines an interpolation mode with reference to the motion index value assigned for each pixel to be interpolated by the motion detector 1. The interpolation mode can be determined variously. For example, the interpolation mode can be determined according to the motion index value for the pixel to be interpolated, a value adding the motion index value for at least one adjacent pixel to be interpolated to the motion index value for the pixel to be interpolated, or a value adding the motion index value for at least one adjacent pixel to be interpolated to the motion index value for the pixel to be interpolated by weighting the motion index value for the adjacent pixel to be interpolated. A pixel to be interpolated adjacent to a current pixel to be interpolated means a pixel to be interpolated existing spatially near the current pixel to be interpolated in the current field and a pixel to be interpolated existing in a corresponding position or an adjacent position of the previous field and/or the next field. If the interpolation mode is selected, the mode selector 3 outputs a weighted average by properly weighting the value obtained by the spatial interpolation and the value obtained by the temporal interpolation in the interpolator 2.

Figure 2:
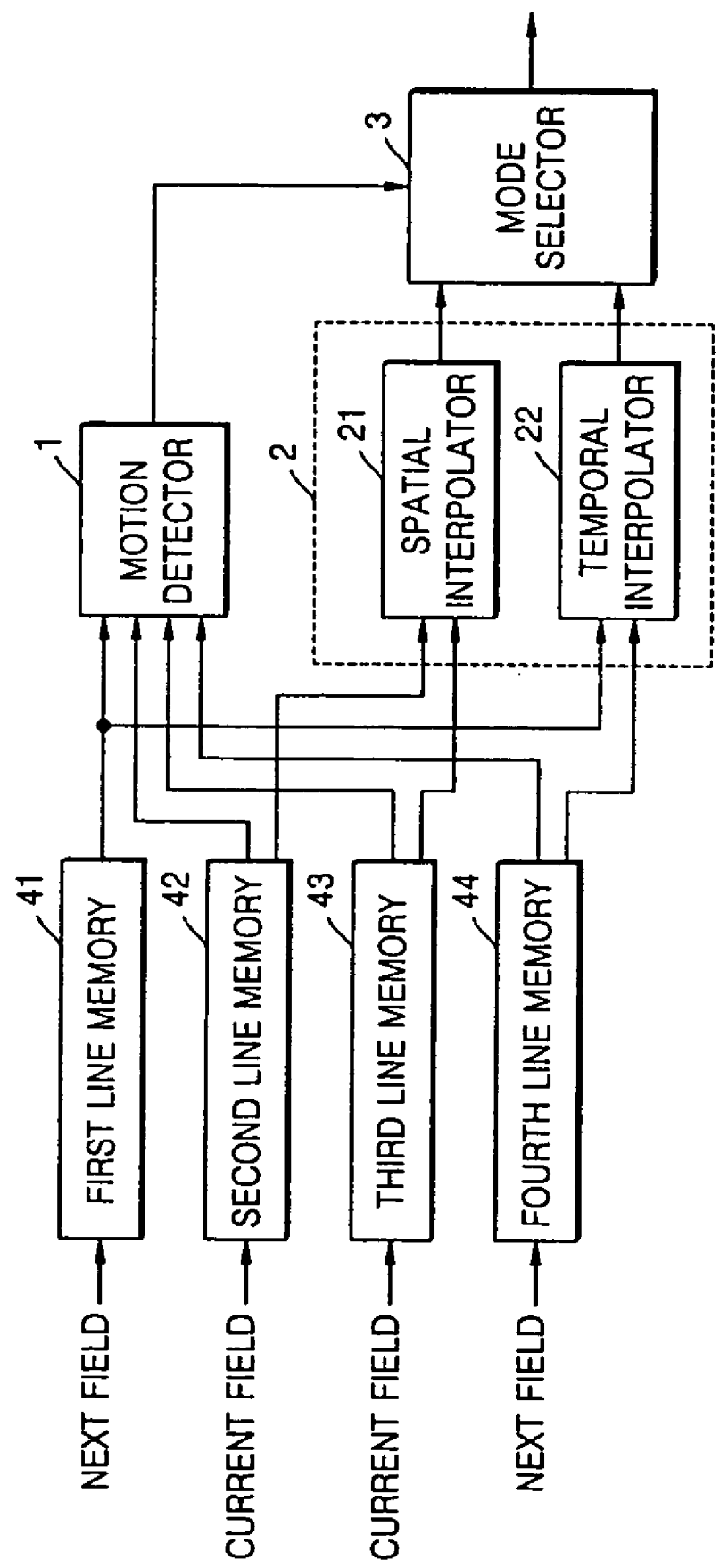
FIG. 2 is a block diagram of a de-interlacing apparatus according to another exemplary embodiment of the present invention.

FIG. 2 is a block diagram of a de-interlacing apparatus according to another exemplary embodiment of the present invention.

Referring to FIG. 2, the de-interlacing apparatus includes the motion detector 1, the interpolator 2 including a spatial interpolator 21 and a temporal interpolator 22, the mode selector 3, and four line memories 41 through 44. The line memory 41 stores row pixels, which compose a next field and correspond to a pixel to be interpolated. The line memory 42 stores pixels, which compose a current field and exist in a lower row of the pixel to be interpolated. The line memory 43 stores pixels, which compose the current field and exist in an upper row of the pixel to be interpolated. The line memory 44 stores row pixels, which compose a previous field and correspond to the pixel to be interpolated.

The motion detector 1 assigns one of a plurality of motion index values for every pixel to be interpolated. That is, the motion detector 1 obtains a first difference value between at least one pixel of the previous field and at least one pixel of the next field, which are adjacent to the pixel to be interpolated of the current field. If the first difference value is more than or equal to a first threshold value, the motion detector 1 determines that a large motion exists and assigns 2 as the motion index value. If the first difference value is less than the first threshold value and more than or equal to a second threshold value, the motion detector 1 determines that a small motion exists and assigns 1 as the motion index value. Here, the first and second threshold values are properly determined by experiments according to characteristics of the video signal, and the first threshold value is more than the second threshold value.

If the first difference value is less than the second threshold value, the motion detector 1 assigns the motion index value by determining whether a motion exists through the following procedures. That is, the motion detector 1 obtains a second difference value between at least one pixel of the current field and at least one pixel of the previous field or the next field, which are adjacent to the pixel to be interpolated, and a third difference value between pixels, which are adjacent to the pixel to be interpolated and exist in the current field, and if the second difference value is more than or equal to a third threshold value and the third difference value is less than a fourth threshold value, the motion detector 1 assigns 1 as the motion index value. If the first difference value is less than the second threshold value, the second difference value is more than or equal to the third threshold value, and the third difference value is less than the fourth threshold value, the motion detector 1 determines that different objects or backgrounds exist in the current field and the previous field and/or the next field not that a motion does not exist. In the present embodiment, to assign 1 as the motion index value, the motion detector 1 detects the motion more precisely by checking the first difference between an adjacent pixel of the previous field and an adjacent pixel of the next field, the second difference value between an adjacent pixel of the current field and an adjacent pixel of the previous field and/or the next field, and the third difference value between adjacent pixels of the current field in which the pixel to be interpolated exists. If the third difference value is less than the fourth threshold value, that is, if a value of the pixel to be interpolated is similar to values of adjacent pixels of the current field and different from values of adjacent pixels of the previous field and/or the next field, then an object or a background existing in the current field is different from that existing in the previous field and/or the next field. The third and fourth threshold values are also properly determined by experiments according to characteristics of the video signal.

The interpolator 2 includes the spatial interpolator 21 and the temporal interpolator 22 to respectively perform the spatial interpolation and the temporal interpolation on the pixel to be interpolated by adopting one of various conventional methods and methods to be developed next, as illustrated in FIG. 1. The spatial interpolator 21 includes a direction selector (not shown) determining an edge direction for the interpolation. The spatial interpolator 21 determines an average value of pixels, which are adjacent to the pixel to be interpolated and exist to the determined edge direction, as a value of the pixel to be interpolated. The temporal interpolator 22 determines an average value of at least one adjacent pixel of the previous field and at least one adjacent pixel of the next field, which exist in a position corresponding to the pixel to be interpolated, as the value of the pixel to be interpolated.

The mode selector 3 determines one of a plurality of interpolation modes with reference to the motion index value assigned for each pixel to be interpolated by the motion detector 1 as illustrated in FIG. 1, obtains a weighted average by weighting a temporal interpolation value and a spatial interpolation value respectively output from the temporal interpolator 22 and the spatial interpolator 21 according to the determined interpolation mode, and outputs the value of the pixel to be interpolated. A window determining a range of a referred motion index value can be variously set.

Figure 3:
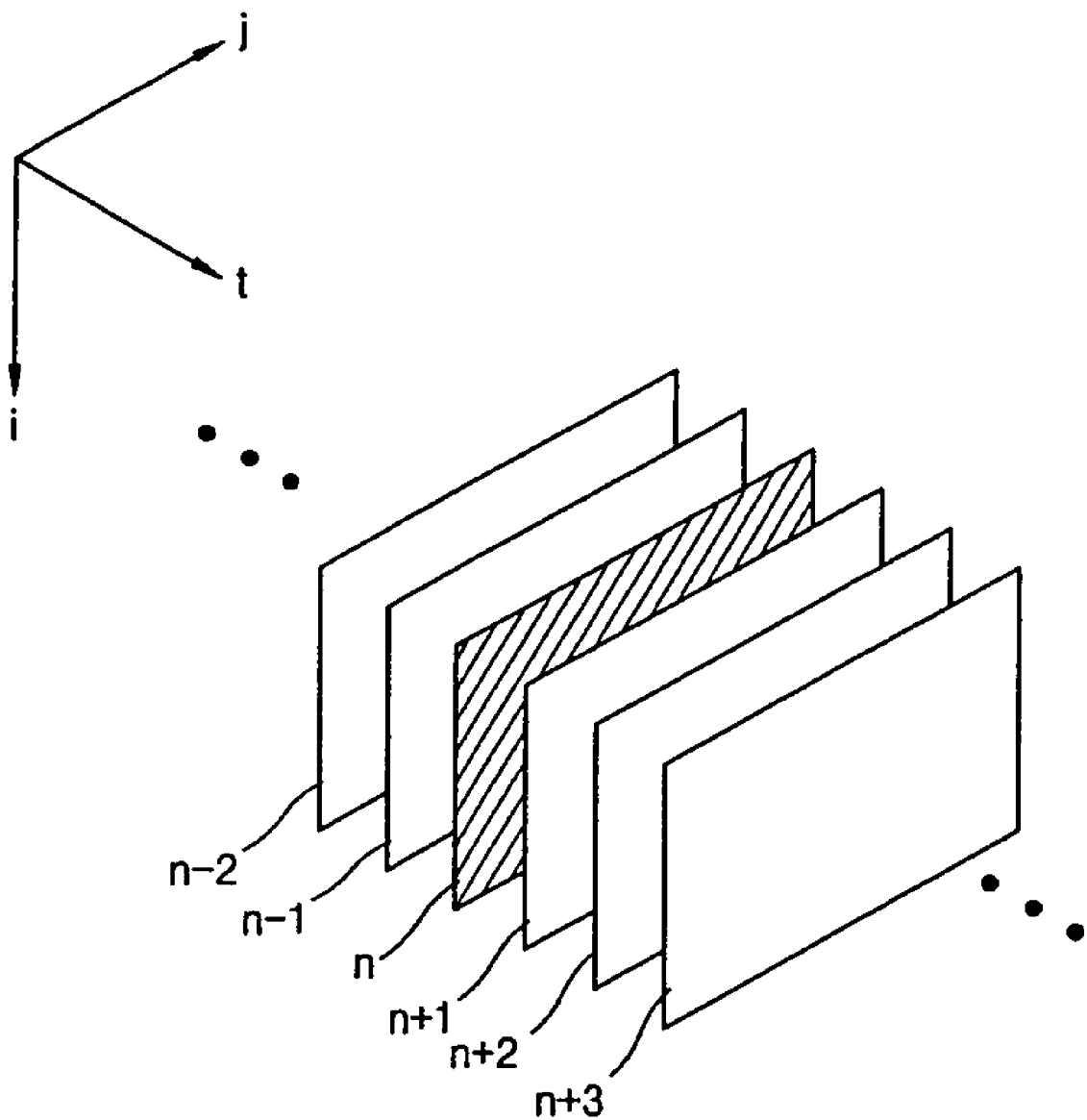
FIG. 3 is a reference diagram illustrating an interlaced format video signal input to the apparatus of FIG. 1 or 2.

FIG. 3 is a reference diagram illustrating an interlaced format video signal input to the apparatus of FIG. 1 or FIG. 2.

Referring to FIG. 3, the interlaced format video signal includes a plurality of fields along a time axis t. A field n indicates the current field, a field n−1 indicates the previous field, and a field n+1 indicates the next field. Likewise, a field n−2 indicates the previous field of the field n−1 and a field n+1 indicates the next field of the field n+1 (n is an integer).

Each field includes two-dimensional pixels at intersections of a plurality of rows i with a plurality of columns j (i and j are integers).

Figure 4:
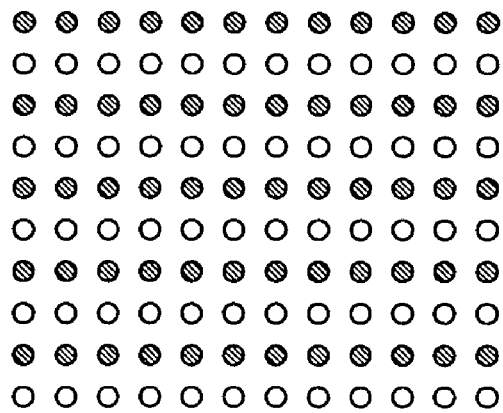
FIG. 4 is a reference diagram illustrating a relationship between a field and a frame.
Figure 4:
Figure 4:
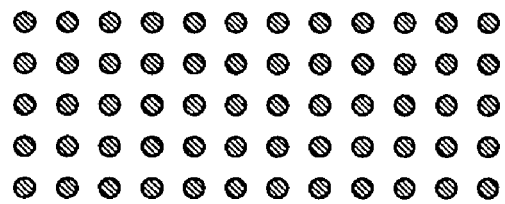
Figure 4:
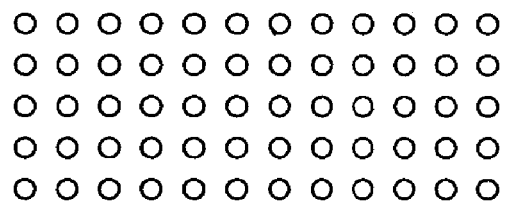

FIG. 4 is a reference diagram illustrating a relationship between a field and a frame.

Referring to FIG. 4, one frame can be divided into two fields. One of the two fields is made up of only pixels of odd rows of the frame, and the other is made up of only pixels of even rows of the frame. That is, one frame is obtained by merging two fields. If the frame includes p*q pixels, each of the two fields includes (p/2)*q pixels (p, p/2, and q are integers). The de-interlacing is to make frames by interpolating fields, that is, filling pixels composing one field in the other one.

Figure 5:
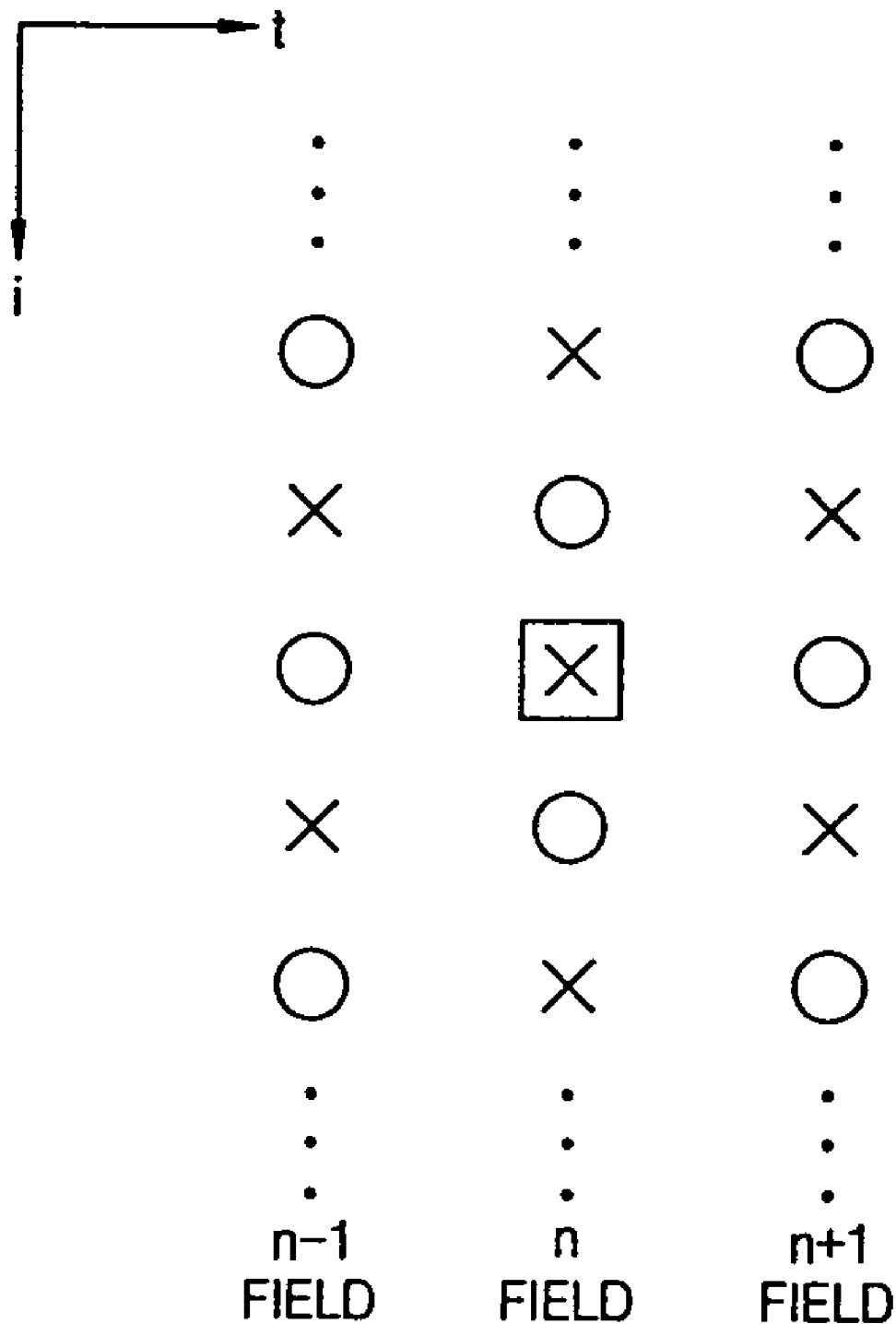
FIG. 5 is a reference diagram illustrating the de-interlacing concept according to the present invention.

FIG. 5 is a reference diagram illustrating a de-interlacing concept according to the present invention.

Referring to FIG. 5, the field n, which is the current field, the field n−1, which is the previous field, and the field n+1, which is the next field, are shown in a t-i plane. Circle marks represent existing pixels, cross marks represent pixels to be interpolated. Especially, a cross mark surrounded by a square represents a pixel to be interpolated, which is currently intended to obtain a value of the pixel to be interpolated. The pixel to be interpolated, which is mentioned hereinafter, indicates the current pixel to be interpolated.

Figure 6A:
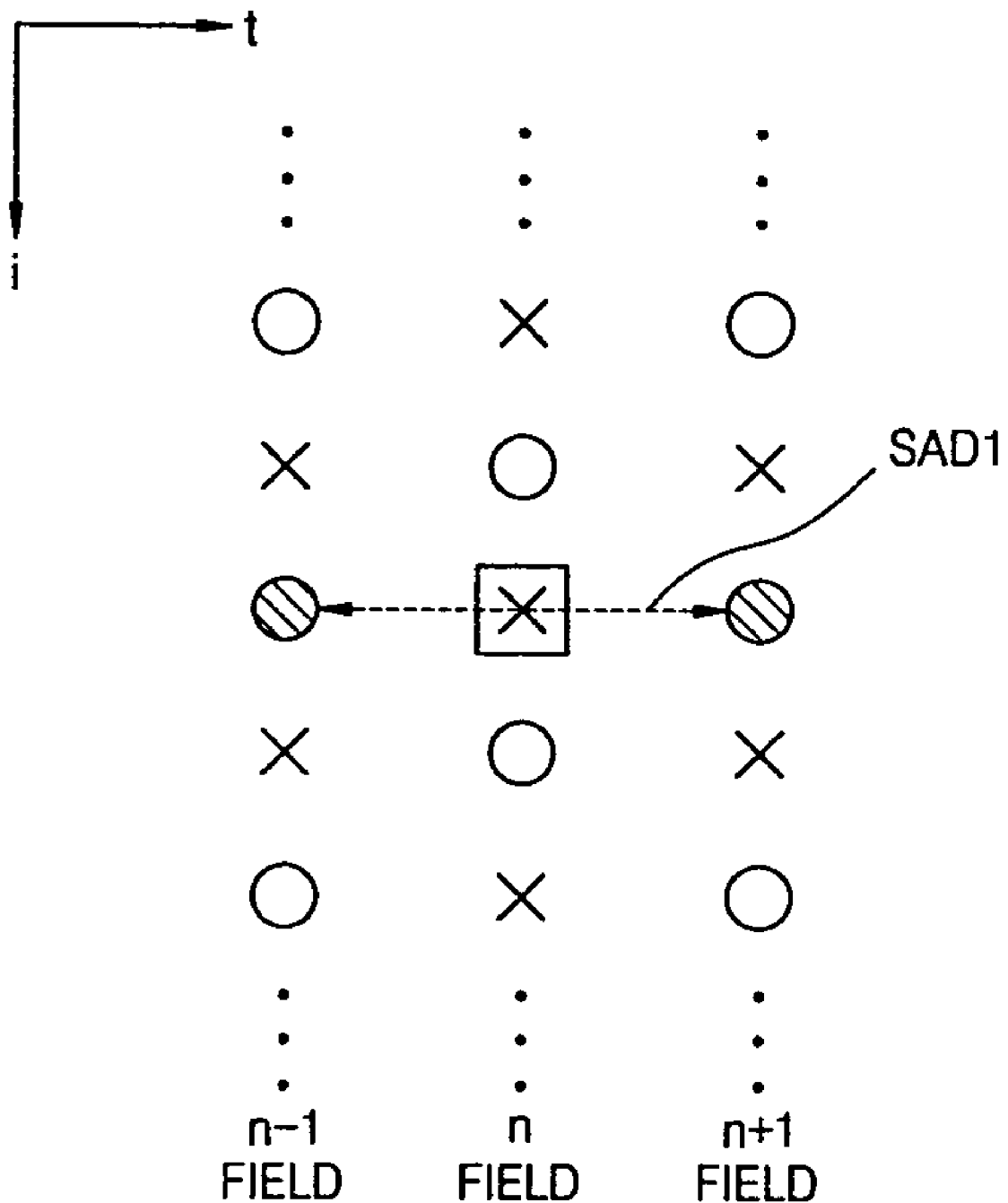
FIGS. 6A through 6C are reference diagrams illustrating first, second, and third difference values, which are criteria used in the present invention to determine a motion index value.
Figure 6B:
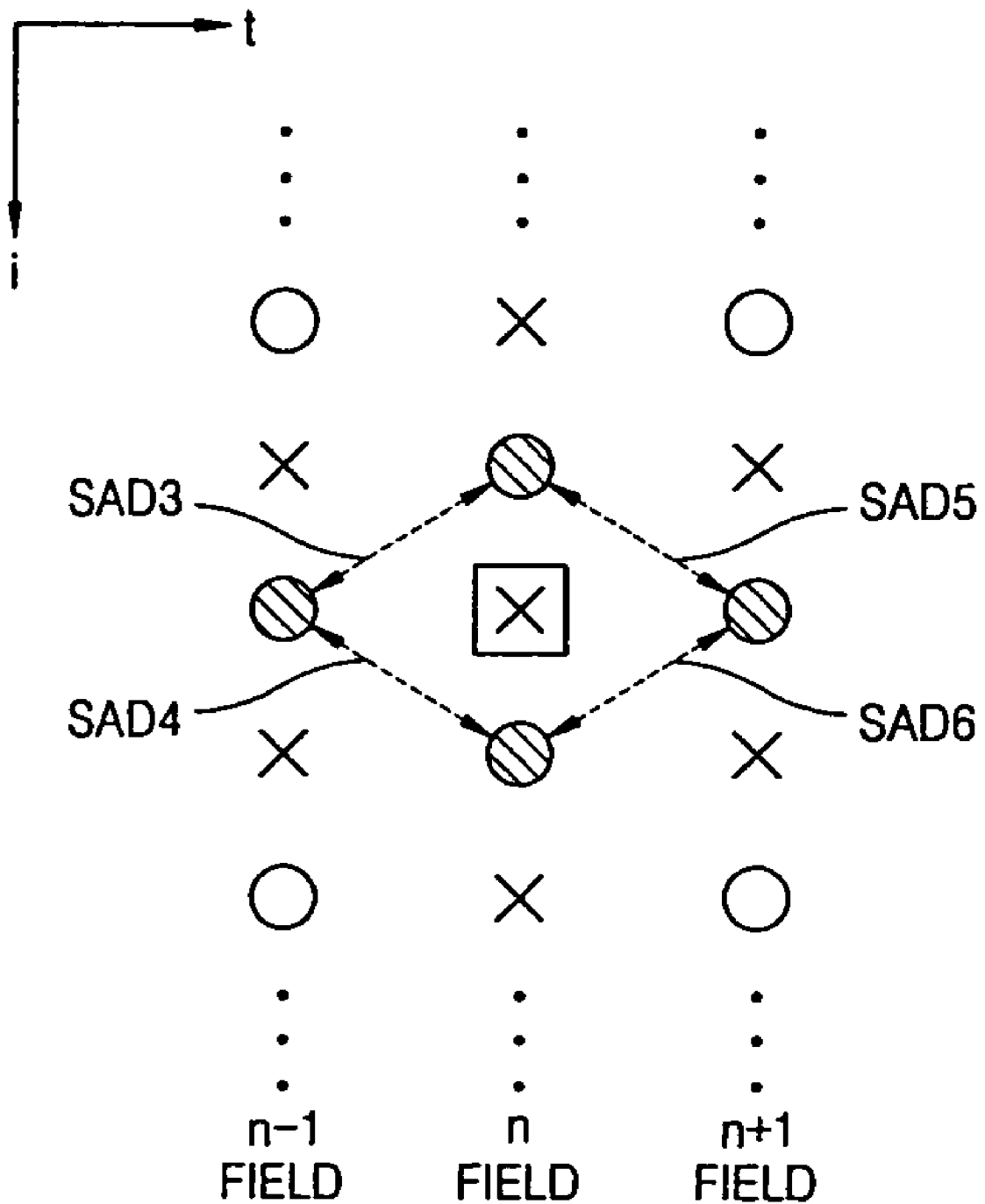
Figure 6C:
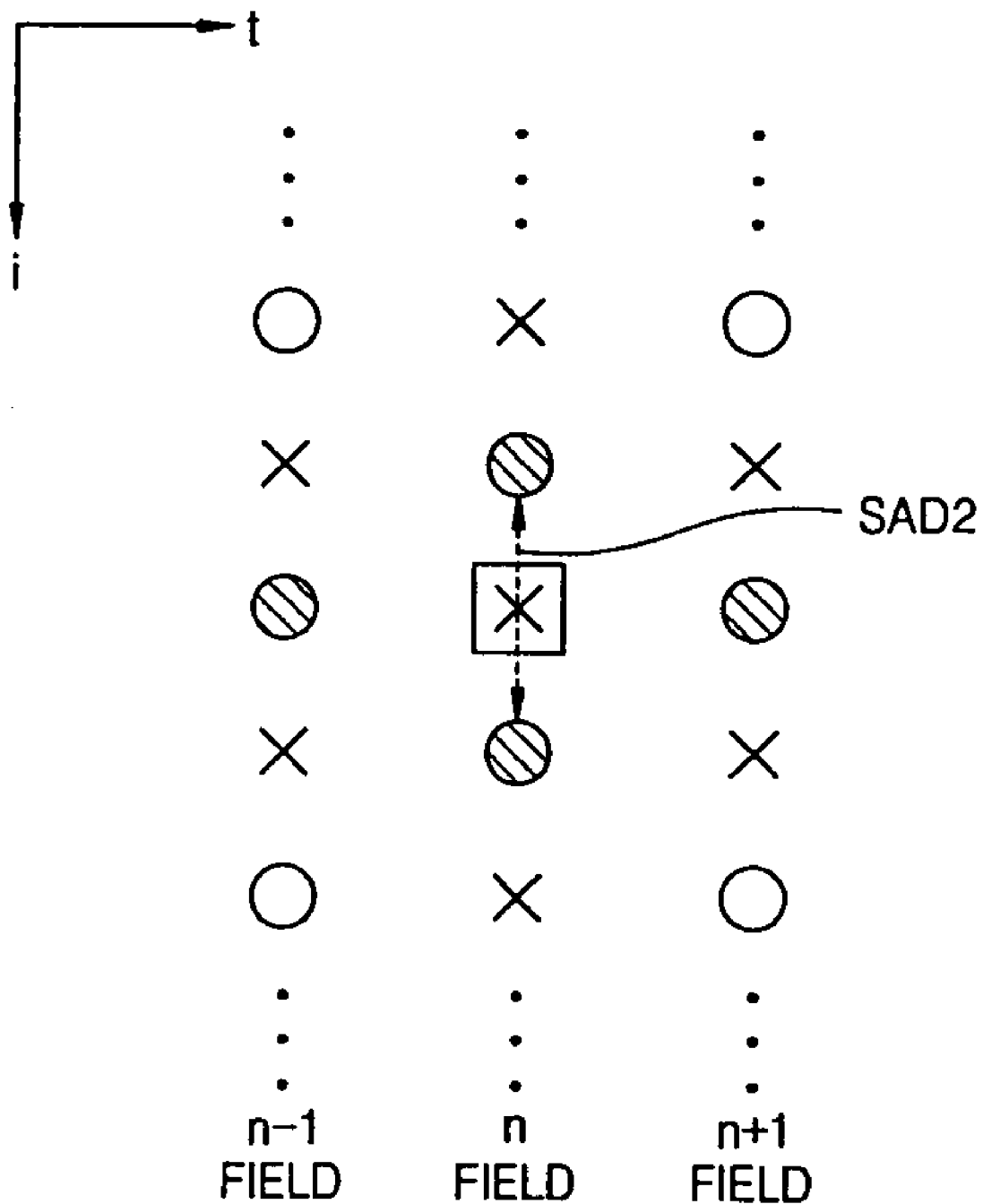

FIGS. 6A through 6C are reference diagrams illustrating first, second, and third difference values which are criteria used in the present invention to determine the motion index value.

Referring to FIG. 6A, the first difference value indicates a sum of absolute difference (SAD) 1. The SAD1 represents a difference value between at least one pixel of the previous field and at least one pixel of the next field, which are adjacent to the pixel to be interpolated. Here, the difference value can be a sum or an average of difference between at least two corresponding pixels. Also, the difference value can be obtained by weighting the selected pixels. For example, a pixel nearer from the pixel to be interpolated is weighted more, and a pixel farther from the pixel to be interpolated is weighted less.

Referring to FIG. 6B, the second difference value indicates at least one of an SAD3, an SAD4, an SAD5, and an SAD6. The SAD3 and the SAD4 represent difference values between at least one pixel of the current field and at least one pixel of the previous field, which are adjacent to the pixel to be interpolated, and the SAD5 and the SAD6 represent difference values between at least one pixel of the current field and at least one pixel of the next field, which are adjacent to the pixel to be interpolated.

Referring to FIG. 6C, the third difference value indicates an SAD2. The SAD2 represents a difference value between at least one pixel, which exists in the current field, is adjacent to the pixel to be interpolated, and exists in an upper row of the pixel to be interpolated, and at least one pixel, which exists in the current field, is adjacent to the pixel to be interpolated, and exists in a lower row of the pixel to be interpolated.

FIGS. 7A through 7F are reference diagrams illustrating embodiments of the SAD1, SAD2, SAD3, SAD4, SAD5, and SAD6.

A pixel $Y_n(i, j)$ means a pixel existing in a position (i, j) of the field n. In the line memory 41, pixels $Y_{n+1}(i-1,)$ existing in the next field and in the same row as the pixel to be interpolated are stored. In the line memory 42, pixels $Y_n(i+1,)$ existing in the current field and in the lower row of the pixel to be interpolated are stored. In the line memory 43, pixels $Y_n(i-1,)$ existing in the current field and in the upper row of the pixel to be interpolated are stored. In the line memory 44, pixels $Y_{n-1}(i,)$ existing in the previous field and in the same row as the pixel to be interpolated are stored. The motion detector 1 obtains the SAD1, SAD2, SAD3, SAD4, SAD5, and SAD6 as follows. However, the SAD2, SAD3, SAD4, SAD5, and SAD6 except the SAD1 do not always have to be obtained. That is, if a motion index value $M_n(i, j)$ is obtained with only the SAD1, the others do not have to be obtained.

Figure 7A:
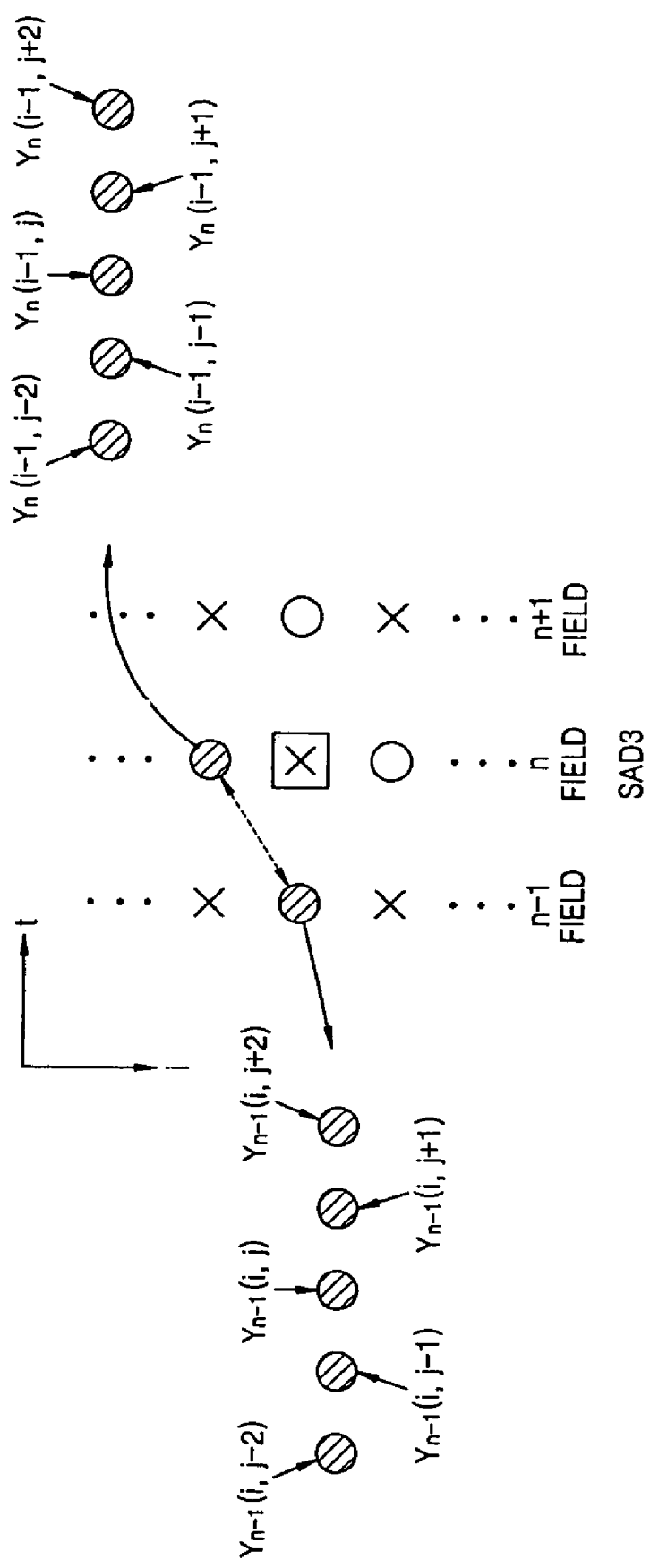
FIGS. 7A through 7F are reference diagrams illustrating embodiments of an SAD1, SAD2, SAD3, SAD4, SAD5, and SAD6.

Referring to FIG. 7A, the SAD3, one of the second difference values, means a difference value between 5 adjacent pixels of the current field, i.e., pixels $Y_n(i-1, j-2)$, $Y_n(i-1, j-1)$, $Y_n(i-1, j)$, $Y_n(i-1, j+1)$, and $Y_n(i-1, j+2)$ existing in the upper row, and 5 adjacent pixels of the previous field, i.e., pixels $Y_{n-1}(i, j-2)$, $Y_{n-1}(i, j-1)$, $Y_{n-1}(i, j)$, $Y_{n-1}(i, j+1)$, and $Y_{n-1}(i, j+2)$ existing in the same row, against the pixel to be interpolated $Y_n(i, j)$. The SAD3 is obtained by Equation 1.

$$SAD3 = \sum_{k=-2}^{2} |Y_{n-1}(i, j+k) - Y_n(i-1, j+k)| \qquad \text{[Equation 1]}$$

Figure 7B:
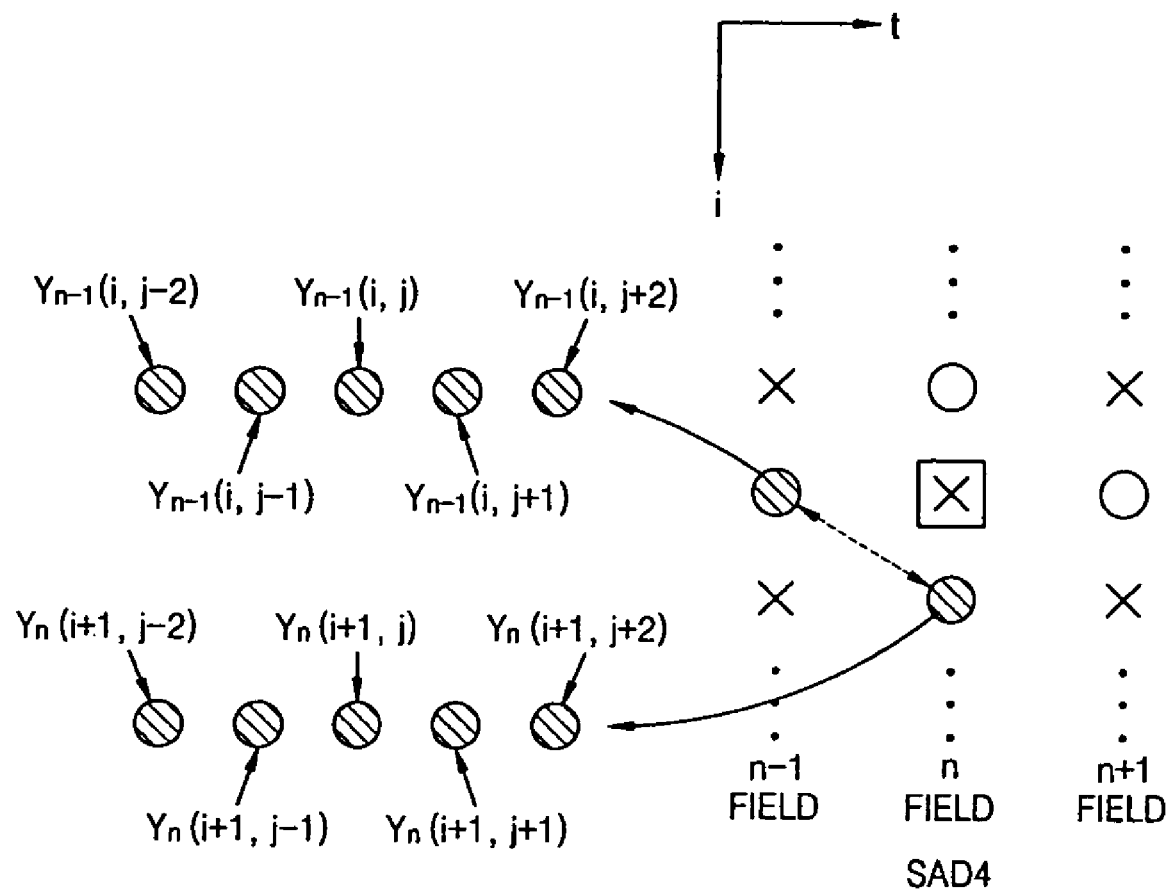

Referring to FIG. 7B, the SAD4, one of the second difference values, means a difference value between 5 adjacent pixels of the current field, i.e., pixels $Y_n(i+1, j-2)$, $Y_n(i+1, j-1)$, $Y_n(i+1, j)$, $Y_n(i+1, j+1)$, and $Y_n(i+1, j+2)$ existing in the lower row, and 5 adjacent pixels of the previous field, i.e., pixels $Y_{n-1}(i, j-2)$, $Y(i, j-1)$, $Y_{n-1}(i, j)$, $Y_{n-1}(i, j+1)$, and $Y_{n-1}(i, j+2)$ existing in the same row, against the pixel to be interpolated $Y_n(i, j)$. The SAD4 is obtained by Equation 2.

$$SAD4 = \sum_{k=-2}^{2} |Y_{n-1}(i, j+k) - Y_n(i+1, j+k)| \qquad \text{[Equation 2]}$$

Figure 7C:
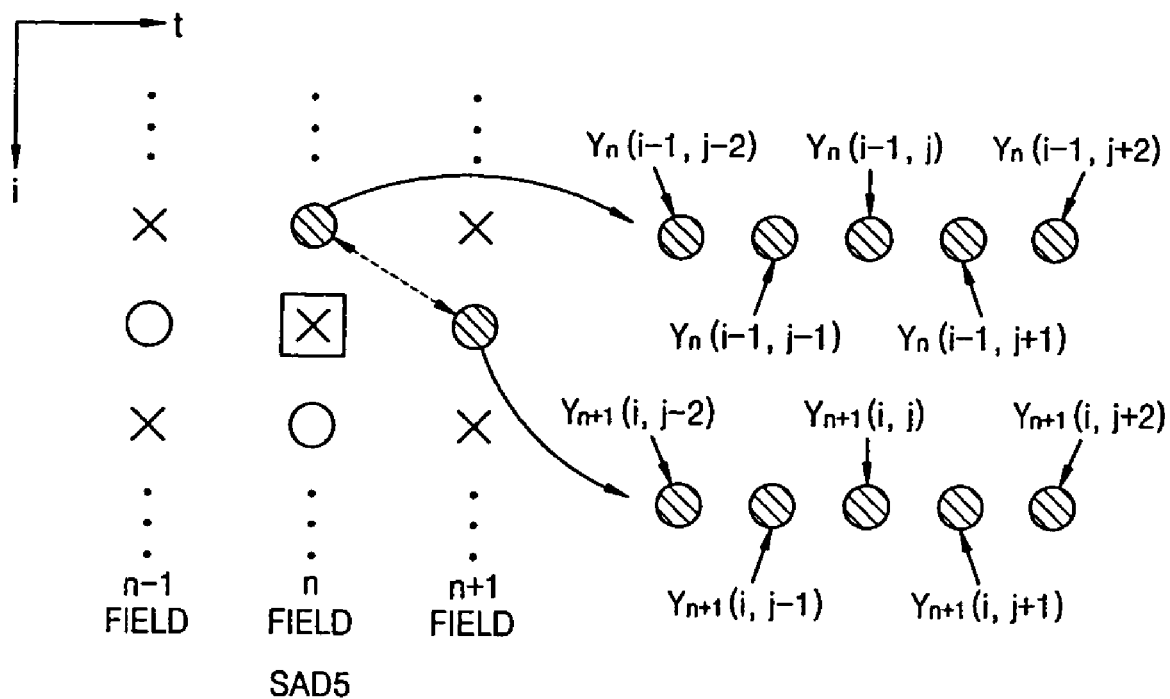

Referring to FIG. 7C, the SAD5, one of the second difference values, means a difference value between 5 adjacent pixels of the current field, i.e., pixels $Y_n(i-1, j-2)$, $Y_n(i-1, j-1)$, $Y_n(i-1, j)$, $Y_n(i-1, j+1)$, and $Y_n(i-1, j+2)$ existing in the upper row, and 5 adjacent pixels of the next field, i.e., pixels $Y_{n+1}(i, j-2)$, $Y_{n+1}(i, j-1)$, $Y_{n+1}(i, j)$, $Y_{n+1}(i, j+1)$, and $Y_{n+1}(i, j+2)$ existing in the same row, against the pixel to be interpolated $Y_n(i, j)$. The SAD5 is obtained by Equation 3.

$$SAD5 = \sum_{k=-2}^{2} |Y_{n+1}(i, j+k) - Y_n(i-1, j+k)| \qquad \text{[Equation 3]}$$

Figure 7D:
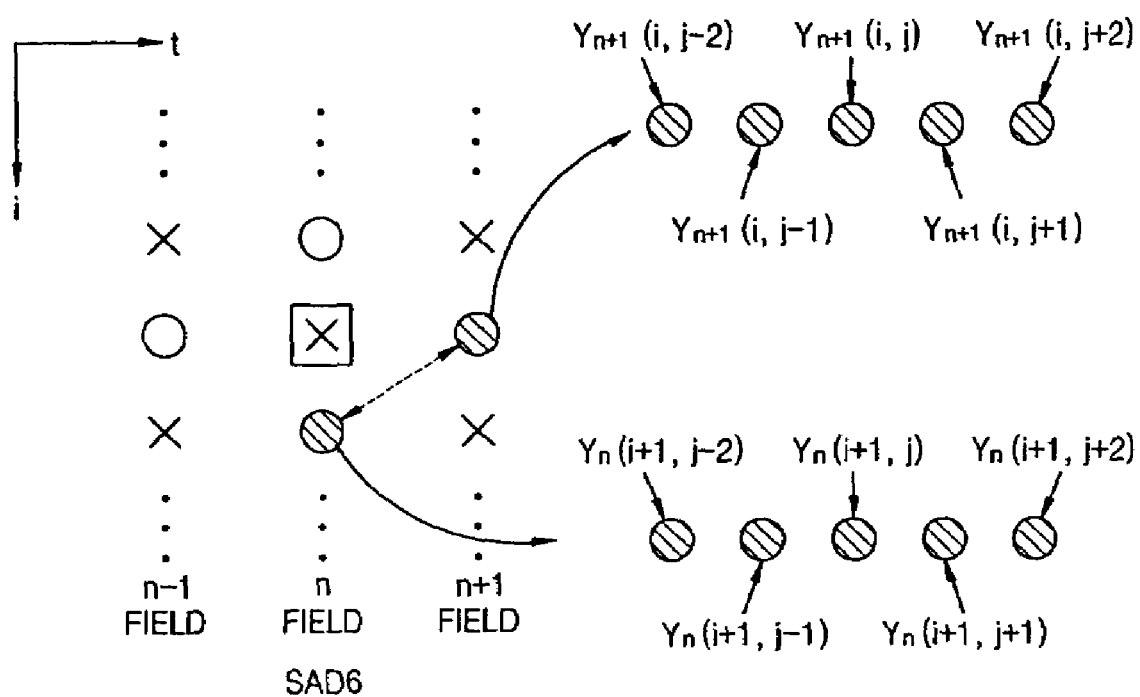

Referring to FIG. 7D, the SAD6, one of the second difference values, means a difference value between 5 adjacent pixels of the current field, i.e., pixels $Y_n(i+1, j-2)$, $Y_n(i+1, j-1)$, $Y_n(i+1, j)$, $Y_n(i+1, j+1)$, and $Y_n(i+1, j+2)$ existing in the lower row, and 5 adjacent pixels of the next field, i.e., pixels $Y_{n+1}(i, j-2)$, $Y_{n+1}(i, j-1)$, $Y_{n+1}(i, j)$, $Y_{n+1}(i, j+1)$, and $Y_{n+1}(i, j+2)$ existing in the same row, against the pixel to be interpolated $Y_n(i, j)$. The SAD6 is obtained by Equation 4.

$$SAD6 = \sum_{k=-2}^{2} |Y_{n+1}(i, j+k) - Y_n(i+1, j+k)| \qquad \text{[Equation 4]}$$

Figure 7E:
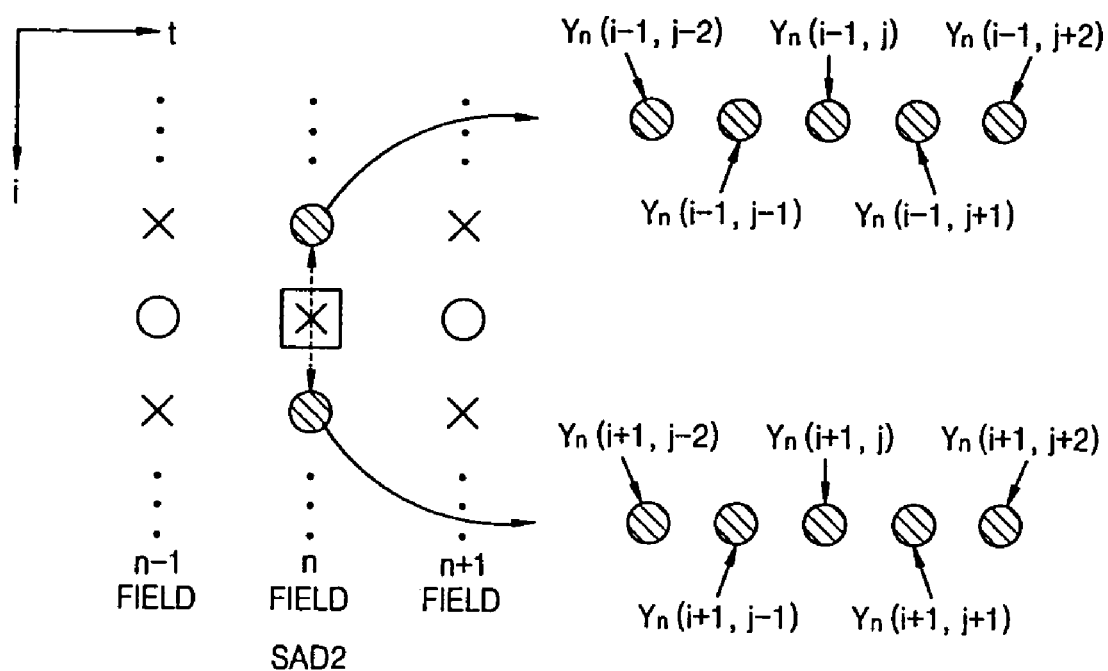

Referring to FIG. 7E, the SAD2, the third difference value, means a difference value between 5 adjacent pixels existing in the upper row of the current field, i.e., pixels $Y_n(i-1, j-2)$, $Y_n(i-1, j-1)$, $Y_n(i-1, j)$, $Y_n(i-1, j+1)$, and $Y_n(i-1, j+2)$, and 5 adjacent pixels existing in the lower row of the current field, i.e., pixels $Y_n(i+1, j-2)$, $Y_n(i+1, j-1)$, $Y_n(i+1, j)$, $Y_n(i+1, j+1)$, and $Y_n(i+1, j+2)$, against the pixel to be interpolated $Y_n(i, j)$. The SAD2 is obtained by Equation 5.

$$SAD2 = \sum_{k=-2}^{2} |Y_n(i-1, j+k) - Y_n(i+1, j+k)| \quad \text{[Equation 5]}$$

Figure 7F:
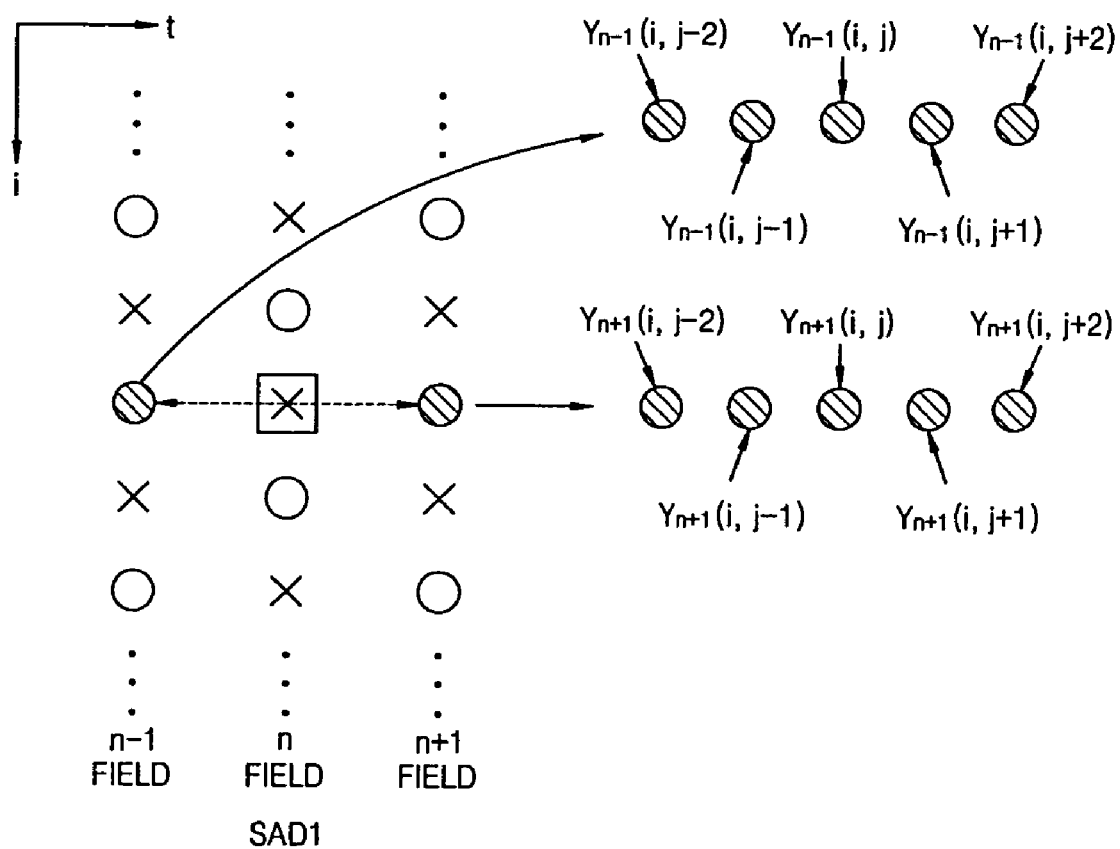

Referring to FIG. 7F, the SAD1, the first difference value, means a difference value between 5 adjacent pixels existing in the same row of the previous field, i.e., pixels $Y_{n-1}(i, j-2)$, $Y_{n-1}(i, j-1)$, $Y_{n-1}(i, j)$, $Y_{n-1}(i, j+1)$, and $Y_{n-1}(i, j+2)$, and 5 adjacent pixels existing in the same row of the next field, i.e., pixels $Y_{n+1}(i, j-2)$, $Y_{n+1}(i, j-1)$, $Y_{n+1}(i, j)$, $Y_{n+1}(i, j+1)$, and $Y_{n+1}(i, j+2)$, against the pixel to be interpolated $Y_n(i, j)$. The SAD1 is obtained by Equation 6.

$$SAD1 = \sum_{k=-2}^{2} |Y_{n-1}(i, j+k) - Y_{n+1}(i, j+k)| \quad \text{[Equation 6]}$$

As an alternative plan, the motion detector 1 passes pixels stored in the line memories 1 through 4 (41 through 44) via an one-dimensional low pass filter (LPF) (not shown) in advance and uses the LPF passed pixels to obtain the SAD1, SAD2, SAD3, SAD4, SAD5, and SAD6. The pixels passed via the LPF are stronger against a noise signal. The LPF is obtained by Equation 7.

$$Y_n(i, j) = \frac{1}{16} \sum_{k=-2}^{2} w_k Y_n(i, j+k) \quad \text{[Equation 7]}$$

Here, $w_0$ is 6, $w_{+1}$ and $w_{-1}$ are 4, and $w_{+2}$ and $w_{-2}$ are 1.

The motion detector 1 obtains the motion index value $M_n(i, j)$ for the pixel to be interpolated $Y_n(i, j)$ on the basis of the obtained the SAD1, which is the first difference value, the SAD3, SAD4, SAD5, and SAD6, which are the second difference values, and the SAD2, which is the third difference value, as follows.

If the SAD1 is more than or equal to a first threshold value TH1, the motion detector 1 determines that a large motion exists and assigns 2 as the motion index value $M_n(i, j)$. If the SAD1 is less than the first threshold value TH1 and more than or equal to a second threshold value TH2, the motion detector 1 determines that a small motion exists and assigns 1 as the motion index value $M_n(i, j)$. The first threshold value TH1 is more than the second threshold value TH2.

A case where the SAD1 is less than the first threshold value TH1 is as follows. That is, if one of following conditions <condition 1>, <condition 2>, <condition 3>, and <condition 4> is satisfied, the motion detector 1 assigns 1 as the motion index value $M_n(i, j)$. If none of following conditions <condition 1>, <condition 2>, <condition 3>, and <condition 4> are satisfied, the motion detector 1 assigns 0 as the motion index value $M_n(i, j)$.

<condition 1>
{SAD1<TH2} and
{SAD3>TH3} or {SAD4>TH3} or {SAD5>TH3} or {SAD6>TH3}

Here, TH3 indicates the third threshold value.

<condition 2>
{SAD1<TH2} and
{SAD2<TH4} and
{SAD3>TH3} or {SAD4>TH3} or {SAD5>TH3} or {SAD6>TH3}

Here, TH3 indicates the third threshold value, and TH4 indicates the fourth threshold value.

<condition 3>
{TH5<SAD1<TH2} and
{SAD3>TH3} or {SAD4>TH3} or {SAD5>TH3} or {SAD6>TH3}

Here, TH3 indicates the third threshold value, TH5 indicates the fifth threshold value, and TH5 is less than TH2.

<condition 4>
{TH5<SAD1<TH2} and
{SAD2<TH4} and
{SAD3>TH3} or {SAD4>TH3} or {SAD5>TH3} or {SAD6>TH3}

Here, TH3 indicates the third threshold value, TH4 indicates the fourth threshold value, TH5 indicates the fifth threshold value, and TH5 is more than 0 and less than TH2.

In the conditions <condition 3> and <condition 4>, a condition where the SAD1 is more than or equal to the fifth threshold value is added to a condition where the SAD1 is less than the second threshold value. Accordingly, since a case where the motion index value is assigned as 1 by misconceiving that a small motion exists despite that a motion never or rarely exists such that images with a horizontal line pattern are continuous can be avoided, the motion can be detected more elaborately. However, since the computational amount relatively increases if a condition is added, one of the conditions is selected by properly considering data features and system resources.

The motion detector 1 transmits the obtained motion index value $M_n(i, j)$ to the mode selector 3. The mode selector 3 selects an interpolation mode M_sum by Equation 8.

$$\text{M\_sum} = \sum_{k=-2}^{2} M_n(i, j+k) + \sum_{k=-2}^{2} M_{n-1}(i-1, j+k) + \sum_{k=-2}^{2} M_{n-1}(i+1, j+k) + \sum_{k=-2}^{2} M_{n-2}(i, j+k) \quad \text{[Equation 8]}$$

Since a maximum value of the motion index value is 2, the interpolation mode M_sum ranges from 0 to 40. That is, theoretically, 40 interpolation modes exist. The mode selector 3 obtains a weighted average by properly weighting the temporal interpolation value and the spatial interpolation value using the interpolation mode M_sum. In more detail, if the interpolation mode M_sum is 0, the mode selector 3 unconditionally outputs the temporal interpolation value, and if the interpolation mode M_sum is more than or equal to a threshold value Tu, the mode selector 3 unconditionally outputs the spatial interpolation value. If the interpolation mode M_sum is less than the threshold value Tu, the mode selector 3 outputs a value in which the temporal interpolation value and the spatial interpolation value are properly added. If the temporal interpolation value is called temp, the spatial interpolation value is called spat, and M_sum'=min (M_sum, Tu), a value of the pixel to be interpolated $Y_{n\_out}(i, j)$ output from the mode selector 3 is obtained by Equation 9.

$$Y_{n\_out}(i, j) = \frac{1}{T_u}(\text{M\_sum}' \times \text{spat} + (T_u - \text{M\_sum}') \times \text{temp}) \quad \text{[Equation 9]}$$

Since an afterimage effect can appear if the M_sum' is getting nearer to 0, a post process such as Equation 10 can be added to prevent the afterimage effect.

$$Y_{n\_out}(i, j) = \alpha \times Y_{n\_out}(i, j) + (1-\alpha) \times \text{spat} \quad \text{[Equation 10]}$$

Here, α is a value between 0 and 1.

A de-interlacing method according to the present invention on the basis of the above configuration is described as follows.

Figure 8A:
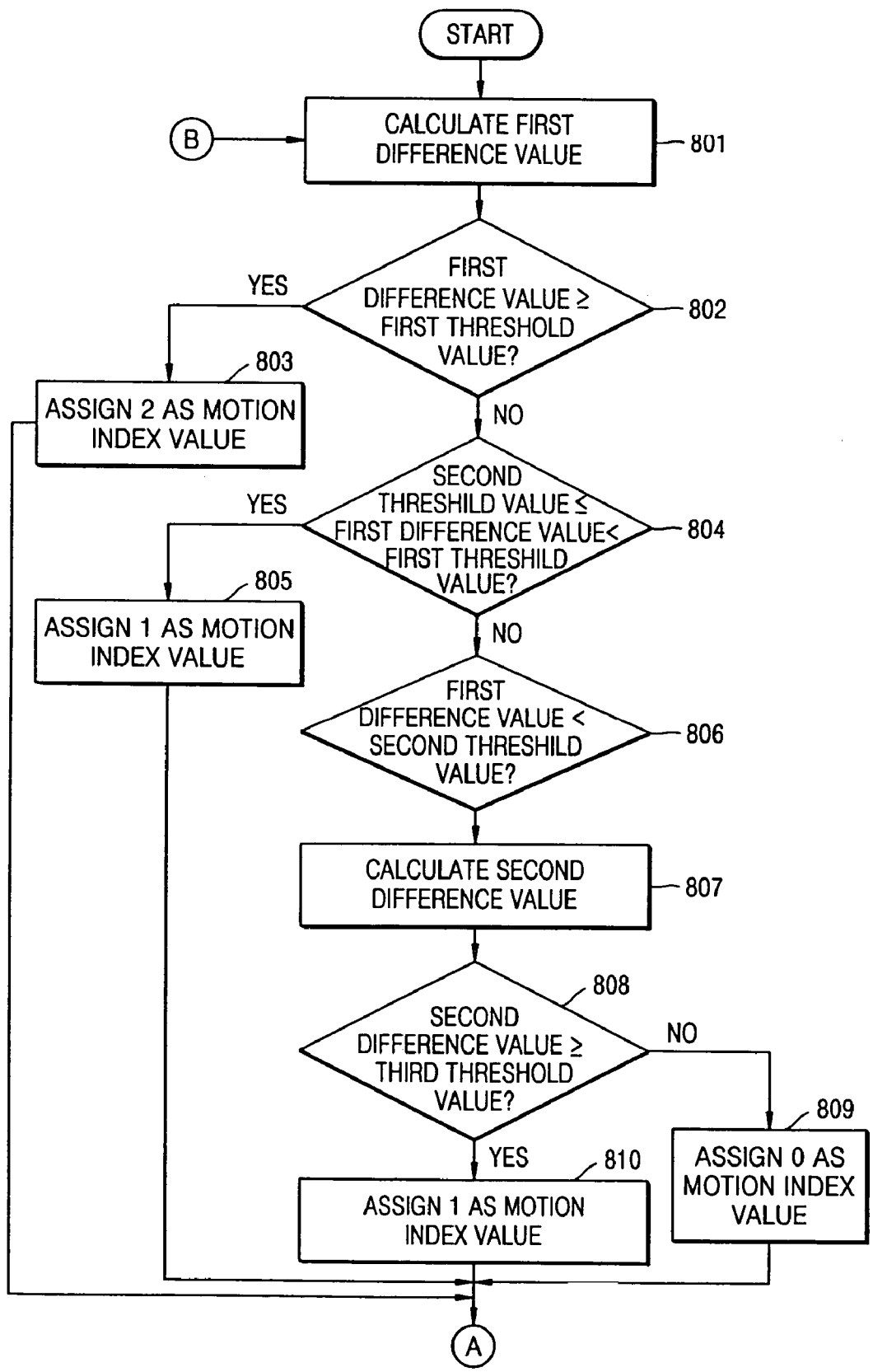
FIGS. 8A and 8B are a flowchart of a de-interlacing method according to an exemplary embodiment of the present invention.
Figure 8B:
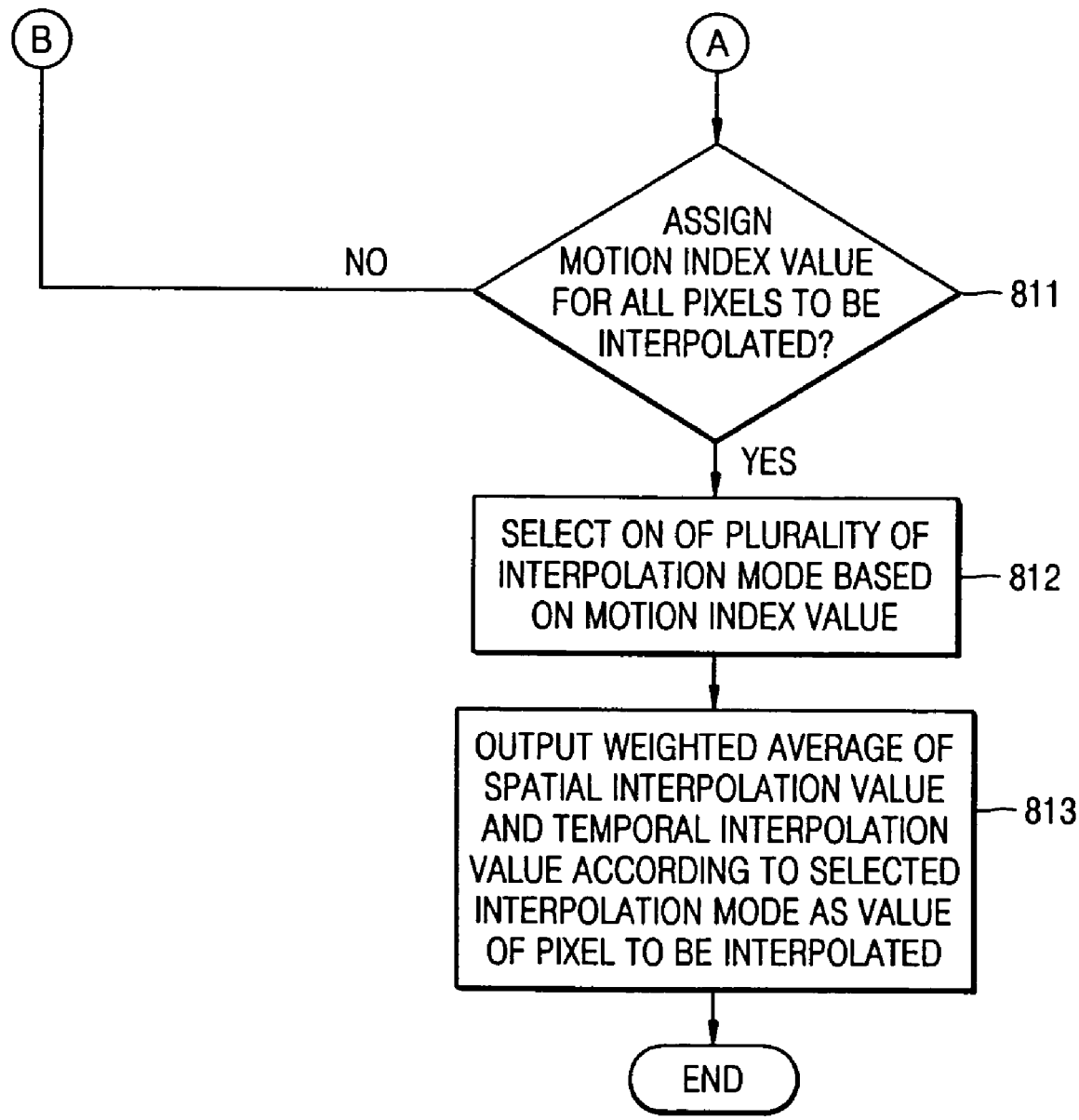

FIGS. 8A and 8B are a flowchart of the de-interlacing method according to an exemplary embodiment of the present invention.

Referring to FIG. 8A, a de-interlacing apparatus calculates a first difference value for a pixel to be interpolated composing a current field in step 801. If the first difference value is more than or equal to a first threshold value in step 802, 2 is assigned as a motion index value in step 803. If the first difference value is less than the first threshold value and more than or equal to a second threshold value in step 804, 1 is assigned as the motion index value in step 805. If the first difference value is less than the second threshold value in step 806, a second difference value is calculated in step 807. If the second difference value is less than a third threshold value in step 808, 0 is assigned as the motion index value in step 809, and if the second difference value is more than or equal to the third threshold value in step 808, 1 is assigned as the motion index value in step 810. As an alternative plan, another condition can be added in steps 807 and 808. That is, a third difference value is calculated in step 807. If the second difference value is more than or equal to the third threshold value and the third difference value is less than a fourth threshold value in step 808, 1 is assigned as the motion index value in step 810. If the second difference value is less than the third threshold value or the third difference value is more than or equal to the fourth threshold value in step 808, 0 is assigned as the motion index value in step 809.

As shown in FIG. 8B, if the motion index value is assigned for all pixels to be interpolated existing in the current field in step 811, the de-interlacing apparatus selects one of a plurality of interpolation modes on the basis of the motion index value within a predetermined window for the pixel to be interpolated in step 812 and outputs a weighted average obtained by weighting the temporal interpolation value and the spatial interpolation value according to the selected interpolation mode in step 813.

The de-interlacing apparatus performing the de-interlacing method described above is also installed in a video decoder. Also, the de-interlacing apparatus according to the present invention is installed in a reproducing apparatus. That is, a video decoder or a reproducing apparatus in which an interlaced format video signal is necessarily input and transformed into a progressive format video signal is applicable for this.

The de-interlacing method described above can also be written as computer programs. Functional programs, codes, and code segments for accomplishing the computer programs can be easily construed by programmers skilled in the art to which the present invention pertains. Also, the de-interlacing method is embodied by storing the computer programs in a computer readable recording medium, reading the computer programs by a computer, and executing the computer programs by the computer. The computer readable recording medium includes magnetic storage media, optical recording media, and storage media such as carrier waves.

As described above, the present invention provides a de-interlacing method and an apparatus, a video decoder, and a reproducing apparatus thereof, interpolation quality of which is improved by estimating motion of a video signal more precisely. Furthermore, the interpolation quality is improved by estimating motion of a video signal more precisely and reflecting the estimated result to the interpolation without increasing the number of line memories, i.e., with only 4 line memories used in a conventional method.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A de-interlacing method for transforming an interlaced format into a progressive format, the method comprising:
   (a) obtaining a first difference value between at least one pixel of a previous field and at least one pixel of a next field, which are adjacent to a pixel to be interpolated of a current field;
   (b) obtaining a second difference value between at least one pixel of the current field and the at least one pixel of the previous field or the next field, which are adjacent to the pixel to be interpolated; and
   (d) obtaining a value of the pixel to be interpolated by weighting a spatial interpolation value and a temporal interpolation value of the pixel to be interpolated according to an interpolation mode selected on the basis of the first and second difference values.

2. The method of claim 1, wherein step (d) comprises:
   if the first difference value is more than or equal to a first threshold value, assigning a value indicating that a large motion exists as a motion index value, if the first difference value is less than the first threshold value and more than or equal to a second threshold value, assigning a value indicating that a small motion exists as the motion index value, and selecting the interpolation mode according to the assigned motion index value, provided that the first threshold value is more than the second threshold value.

3. The method of claim 1, wherein step (d) comprises:
   if the first difference value is less than the second threshold value and the second difference value is more than or equal to a third threshold value, assigning the value indicating that a small motion exists as the motion index value, and selecting the interpolation mode according to the assigned motion index value.

4. The method of claim 1, wherein step (d) comprises:
   if the first difference value is less than the second threshold value and the second difference value is more than or equal to the third threshold value, selecting the interpolation mode assigning more weight on a spatial interpolation value of the pixel to be interpolated rather than a temporal interpolation value of the pixel to be interpolated.

5. The method of claim 1, wherein step (b) comprises:
   (b1) obtaining a difference value between the at least one pixel, which exists in the current field, is adjacent to the pixel to be interpolated, and exists in an upper row of the pixel to be interpolated, and the at least one pixel, which exists in the previous field, is adjacent to the pixel to be interpolated, and exists in the same row as the pixel to be interpolated, as the second difference value.

6. The method of claim 1, wherein step (b) comprises:
   (b2) obtaining a difference value between the at least one pixel, which exists in the current field, is adjacent to the pixel to be interpolated, and exists in a lower row of the pixel to be interpolated, and the at least one pixel, which exists in the previous field, is adjacent to the pixel to be interpolated, and exists in the same row as the pixel to be interpolated, as the second difference value.

7. The method of claim 1, wherein step (b) comprises:
(b3) obtaining a difference value between the at least one pixel, which exists in the current field, is adjacent to the pixel to be interpolated, and exists in an upper row of the pixel to be interpolated, and the at least one pixel, which exists in the next field, is adjacent to the pixel to be interpolated, and exists in the same row as the pixel to be interpolated, as the second difference value.

8. The method of claim 1, wherein step (b) comprises:
(b4) obtaining a difference value between the at least one pixel, which exists in the current field, is adjacent to the pixel to be interpolated, and exists in a lower row of the pixel to be interpolated, and the at least one pixel, which exists in the next field, is adjacent to the pixel to be interpolated, and exists in the same row as the pixel to be interpolated, as the second difference value.

9. The method of claim 1, wherein step (b) comprises:
(b1) obtaining a difference value between the at least one pixel, which exists in the current field, is adjacent to the pixel to be interpolated, and exists in an upper row of the pixel to be interpolated, and the at least one pixel, which exists in the previous field, is adjacent to the pixel to be interpolated, and exists in the same row as the pixel to be interpolated, as the second difference value;
(b2) obtaining a difference value between the at least one pixel, which exists in the current field, is adjacent to the pixel to be interpolated, and exists in a lower row of the pixel to be interpolated, and the at least one pixel, which exists in the previous field, is adjacent to the pixel to be interpolated, and exists in the same row as the pixel to be interpolated, as the second difference value;
(b3) obtaining a difference value between the at least one pixel, which exists in the current field, is adjacent to the pixel to be interpolated, and exists in an upper row of the pixel to be interpolated, and the at least one pixel, which exists in the next field, is adjacent to the pixel to be interpolated, and exists in the same row as the pixel to be interpolated, as the second difference value; and
(b4) obtaining a difference value between the at least one pixel, which exists in the current field, is adjacent to the pixel to be interpolated, and exists in a lower row of the pixel to be interpolated, and the at least one pixel, which exists in the next field, is adjacent to the pixel to be interpolated, and exists in the same row as the pixel to be interpolated, as the second difference value, and
step (d) comprises:
in a case where the first difference value is less than the second threshold value, if any one of the second difference values is more than or equal to the third threshold value, assigning the value indicating that a small motion exists as the motion index value, if all the second difference values are less than the second threshold value, assigning the value indicating that a motion does not exist as the motion index value, and selecting the interpolation mode according to the assigned motion index value.

10. A de-interlacing method for transforming an interlaced format into a progressive format, the method comprising:

(a) obtaining a first difference value between at least one pixel of a previous field and at least one pixel of a next field, which are adjacent to a pixel to be interpolated of a current field;
(b) obtaining a second difference value between at least one pixel of the current field and the at least one pixel of the previous field or the next field, which are adjacent to the pixel to be interpolated;
(c) obtaining a third difference value between at least one pixel of the current field existing in an upper row of the pixel to be interpolated and at least one pixel of the current field existing in a lower row of the pixel to be interpolated; and
(d) obtaining a value of the pixel to be interpolated by weighting a spatial interpolation value and a temporal interpolation value of the pixel to be interpolated according to an interpolation mode selected on the basis of the first, second, and third difference values.

11. The method of claim 10, wherein step (b) comprises:
(b1) obtaining a difference value between the at least one pixel, which exists in the current field, is adjacent to the pixel to be interpolated, and exists in an upper row of the pixel to be interpolated, and the at least one pixel, which exists in the previous field, is adjacent to the pixel to be interpolated, and exists in the same row as the pixel to be interpolated, as the second difference value;
(b2) obtaining a difference value between the at least one pixel, which exists in the current field, is adjacent to the pixel to be interpolated, and exists in a lower row of the pixel to be interpolated, and the at least one pixel, which exists in the previous field, is adjacent to the pixel to be interpolated, and exists in the same row as the pixel to be interpolated, as the second difference value;
(b3) obtaining a difference value between the at least one pixel, which exists in the current field, is adjacent to the pixel to be interpolated, and exists in an upper row of the pixel to be interpolated, and the at least one pixel, which exists in the next field, is adjacent to the pixel to be interpolated, and exists in the same row as the pixel to be interpolated, as the second difference value;
(b4) obtaining a difference value between the at least one pixel, which exists in the current field, is adjacent to the pixel to be interpolated, and exists in a lower row of the pixel to be interpolated, and the at least one pixel, which exists in the next field, is adjacent to the pixel to be interpolated, and exists in the same row as the pixel to be interpolated, as the second difference value, and
step (d) comprises:
in a case where the first difference value is less than the second threshold value, if any one of the second difference values is more than or equal to the third threshold value and the third difference value is less than a fourth threshold value, assigning the value indicating that a small motion exists as the motion index value, if any one of the second difference values is less than the third threshold value or the third difference value is more than or equal to the fourth threshold value, assigning the value indicating that a motion does not exist as the motion index value, and selecting the interpolation mode according to the assigned motion index value.

12. A de-interlacing method comprising:
(a) assigning a motion index value for a pixel to be interpolated on the basis of a first difference value between at least one pixel of a previous field and at least one pixel of a next field, which are adjacent to the pixel to be interpolated of a current field, and a second difference value between at least one pixel of the current field and at least one pixel of the previous field or the next field, which are adjacent to the pixel to be interpolated; and (b) obtaining a value of the pixel to be interpolated by interpolating the pixel to be interpolated according to an interpolation mode selected on the basis of the assigned motion index value.

13. The method of claim 12, wherein step (a) comprises:
if the first difference value is more than or equal to a first threshold value, assigning 2 as the motion index value, and if the first difference value is less than the first threshold value and more than or equal to a second threshold value, assigning 1 as the motion index value.

14. The method of claim 12, wherein step (a) comprises:
if the first difference value is less than the second threshold value, obtaining the second difference value between the at least one pixel of the current field and the at least one pixel of the previous field or the next field, which are adjacent to the pixel to be interpolated, and if the second difference value is more than or equal to a third threshold value, assigning 1 as the motion index value, and if the second difference value is less than the third threshold value, assigning 0 as the motion index value.

15. The method of claim 12, wherein step (b) comprises:
obtaining a weighted average by weighting a spatial interpolation value or a temporal interpolation value of the pixel to be interpolated according to the selected interpolation mode.

16. A de-interlacing apparatus for transforming an interlaced format into a progressive format, the apparatus comprising:
a motion detector which obtains a first difference value between at least one pixel of a previous field and at least one pixel of a next field, which are adjacent to a pixel to be interpolated of a current field, obtains a second difference value between the at least one pixel of the current field and the at least one pixel of the previous field or the next field, which are adjacent to the pixel to be interpolated, and determines a motion index value for the pixel to be interpolated on the basis of the obtained first and second difference values;
an interpolator which calculates a spatial interpolation value by spatial interpolating the pixel to be interpolated and a temporal interpolation value by temporal interpolating the pixel to be interpolated; and
a mode selector which outputs a weighted average as a value of the pixel to be interpolated by weighting the spatial interpolation value and the temporal interpolation value calculated by the interpolator according to the interpolation mode selected on the basis of the motion index value determined by the motion detector.

17. The apparatus of claim 16, wherein the motion detector, if the first difference value is more than or equal to a first threshold value, assigns 2 as a motion index value, if the first difference value is less than the first threshold value and more than or equal to a second threshold value, assigns 1 as the motion index value, if the first difference value is less than the second threshold value and the second difference value is more than or equal to a third threshold value, assigns 1 as the motion index value, and if the second difference value is less than the third threshold value, assigns 0 as the motion index value, where the first threshold value is more than the second threshold value.

18. The apparatus of claim 16, wherein the motion detector obtains a difference value between the at least one pixel, which exists in the current field, is adjacent to the pixel to be interpolated, and exists in an upper row of the pixel to be interpolated, and the at least one pixel, which exists in the previous field, is adjacent to the pixel to be interpolated, and exists in the same row as the pixel to be interpolated, as the second difference value, a difference value between the at least one pixel, which exists in the current field, is adjacent to the pixel to be interpolated, and exists in a lower row of the pixel to be interpolated, and the at least one pixel, which exists in the previous field, is adjacent to the pixel to be interpolated, and exists in the same row as the pixel to be interpolated, as the second difference value, a difference value between at least one pixel, which exists in the current field, is adjacent to the pixel to be interpolated, and exists in an upper row of the pixel to be interpolated, and the at least one pixel, which exists in the next field, is adjacent to the pixel to be interpolated, and exists in the same row as the pixel to be interpolated, as the second difference value, and a difference value between the at least one pixel, which exists in the current field, is adjacent to the pixel to be interpolated, and exists in a lower row of the pixel to be interpolated, and the at least one pixel, which exists in the next field, is adjacent to the pixel to be interpolated, and exists in the same row as the pixel to be interpolated, as the second difference value.

19. A video decoder in which the de-interlacing apparatus of claim 16 is installed.

20. A reproducing apparatus in which the de-interlacing apparatus of claim 16 is installed.

* * * * *